US011139704B2

(12) United States Patent
Sakamoto et al.

(10) Patent No.: US 11,139,704 B2
(45) Date of Patent: Oct. 5, 2021

(54) SALIENT POLE ROTOR WITH MAGNETIC POLE PORTIONS, CONCAVE PORTIONS AND CYLINDRICAL COVER PORTION WITH FIBER FILAMENT

(71) Applicant: MITSUBISHI HEAVY INDUSTRIES ENGINE & TURBOCHARGER, LTD., Sagamihara (JP)

(72) Inventors: Musashi Sakamoto, Tokyo (JP); Yukio Yamashita, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 300 days.

(21) Appl. No.: 16/079,859

(22) PCT Filed: Mar. 9, 2016

(86) PCT No.: PCT/JP2016/057471
§ 371 (c)(1),
(2) Date: Aug. 24, 2018

(87) PCT Pub. No.: WO2017/154156
PCT Pub. Date: Sep. 14, 2017

(65) Prior Publication Data
US 2019/0027979 A1     Jan. 24, 2019

(51) Int. Cl.
*H02K 1/24*    (2006.01)
*H02K 15/12*    (2006.01)
(Continued)

(52) U.S. Cl.
CPC ............... *H02K 1/24* (2013.01); *H02K 1/246* (2013.01); *H02K 15/022* (2013.01); *H02K 15/12* (2013.01); *H02K 19/10* (2013.01); *H02K 1/08* (2013.01)

(58) Field of Classification Search
CPC ............ H02K 1/24; H02K 1/246; H02K 1/08; H02K 15/022; H02K 15/112; H02K 19/10;
(Continued)

(56) References Cited

U.S. PATENT DOCUMENTS 2,913,607 A * 11/1959 Douglas ................. H02K 19/14
310/216.107
3,671,789 A *  6/1972 Menzies ................. H02K 1/246
310/163
(Continued)

FOREIGN PATENT DOCUMENTS

EP      2894767 B1 * 11/2013
JP      7-303357 A    11/1995
(Continued)

OTHER PUBLICATIONS

Written Opinion of the International Searching Authority and International Search Report (forms PCT/ISA/237 and PCT/ISA/210), dated May 24, 2016, for International Application No. PCT/JP2016/057471, with English translations.

*Primary Examiner* — Maged M Almawri (74) *Attorney, Agent, or Firm* — Birch, Stewart, Kolasch & Birch, LLP (57) ABSTRACT

A salient-pole rotor includes a magnetic pole portion having a plurality of protruding portions which protrude outward in a radial direction from a base portion, is disposed to be spaced apart from each other at intervals in a circumferential direction of a rotary shaft and have outer circumferential surfaces along an imaginary cylindrical surface. The magnetic pole portion includes a concave portion reinforcing portion which is provided inside the concave portion and a cylindrical reinforcing portion which covers the magnetic pole portion and the outer circumferential surface of the concave portion reinforcing portion. The base portion has a plurality of slits extending in the circumferential direction to (Continued)

be spaced apart from each other in the radial direction. A slit reinforcing portion formed of a non-magnetic material is provided inside the slits.

1 Claim, 6 Drawing Sheets (51) Int. Cl.
*H02K 15/02* (2006.01)
*H02K 19/10* (2006.01)
*H02K 1/08* (2006.01)

(58) Field of Classification Search
CPC ........ H02K 1/278; H02K 1/27; H02K 1/2786; H02K 1/2753; H02K 1/274
USPC ........... 310/216.107, 216.106, 216.104, 269, 310/156.08–156.15, 156.28, 156.29, 310/156.38, 156.43, 156.45, 154.13, 310/156.01, 156.03, 156.12, 156.21, 310/156.22, 156.23, 153.29, 156.31, 310/156.42, 156.55, 156.68, 6
See application file for complete search history.

(56) References Cited

U.S. PATENT DOCUMENTS

| | | | | |
|---|---|---|---|---|
| 3,679,924 A * | 7/1972 | Menzies | | H02K 1/246 310/163 |
| 3,758,800 A * | 9/1973 | McLaughlin | | H02K 1/246 310/211 |
| 4,110,646 A * | 8/1978 | Rao | | H02K 1/246 310/163 |
| 4,888,513 A * | 12/1989 | Fratta | | H02K 1/246 310/216.017 |
| 4,924,130 A * | 5/1990 | Fratta | | H02K 1/2766 310/156.53 |
| 4,973,872 A * | 11/1990 | Dohogne | | H02K 1/278 310/156.23 |
| 5,292,284 A * | 3/1994 | Denk | | H02K 49/106 310/104 |
| 5,801,478 A * | 9/1998 | Nashiki | | H02K 1/246 310/162 |
| 5,893,205 A * | 4/1999 | McClelland | | H02K 1/246 29/598 |
| 6,064,134 A * | 5/2000 | El-Antably | | H02K 1/246 310/156.21 |
| 6,121,706 A * | 9/2000 | Nashiki | | H02K 1/246 310/152 |
| 6,717,315 B1 * | 4/2004 | Tajima | | H02K 1/278 310/156.45 |
| 6,836,045 B2 * | 12/2004 | Murakami | | H02K 1/246 310/156.53 |
| 6,849,983 B2 * | 2/2005 | Tajima | | H02K 1/246 310/166 |
| 6,940,205 B1 * | 9/2005 | Murakami | | H02K 1/278 310/156.01 |
| 9,362,791 B2 * | 6/2016 | Matsuoka | | H02K 1/272 |
| 9,577,483 B2 * | 2/2017 | Tsuchida | | H02K 1/276 |
| 9,825,515 B2 * | 11/2017 | Ito | | H02P 21/0003 |
| 9,893,581 B2 * | 2/2018 | Kikuchi | | B60L 15/007 |
| 10,008,893 B2 * | 6/2018 | Nigo | | F25B 31/026 |
| 10,439,456 B2 * | 10/2019 | Reddy | | H02K 1/246 |
| 10,491,061 B2 * | 11/2019 | Jassal | | H02K 5/00 |
| 10,658,890 B2 * | 5/2020 | Kolehmainen | | H02K 1/246 |
| 2001/0026108 A1 * | 10/2001 | Tajima | | H02K 1/276 310/156.01 |
| 2003/0062791 A1 * | 4/2003 | Reiter, Jr. | | H02K 1/246 310/156.53 |
| 2004/0201301 A1 * | 10/2004 | Regan | | H02K 1/246 310/156.53 |
| 2006/0284512 A1 * | 12/2006 | Lee | | H02K 1/246 310/216.008 |
| 2007/0071612 A1 * | 3/2007 | Yuratich | | H02K 1/278 417/53 |
| 2007/0108853 A1 * | 5/2007 | Shah | | H02K 1/32 310/61 |
| 2007/0152527 A1 * | 7/2007 | Yura | | H02K 1/246 310/156.53 |
| 2008/0211340 A1 * | 9/2008 | Lee | | H02K 1/246 310/216.004 |
| 2008/0290753 A1 * | 11/2008 | Arimitsu | | H02K 1/276 310/156.36 |
| 2010/0019614 A1 * | 1/2010 | Arend | | H02K 1/26 310/216.106 |
| 2012/0267977 A1 * | 10/2012 | Merwerth | | H02K 1/2766 310/156.53 |
| 2013/0057103 A1 * | 3/2013 | Han | | H02K 1/2773 310/156.12 |
| 2015/0015093 A1 | 1/2015 | Gontermann et al. | | |
| 2016/0056673 A1 * | 2/2016 | Buttner | | H02K 15/022 310/46 |
| 2017/0012481 A1 * | 1/2017 | Ballweg | | H02K 15/028 |
| 2017/0054337 A1 * | 2/2017 | Arimatsu | | H02K 1/274 |
| 2017/0163106 A1 * | 6/2017 | Jassal | | H02K 15/02 |
| 2017/0310171 A1 * | 10/2017 | Reddy | | H02K 3/18 |
| 2018/0083500 A1 * | 3/2018 | Buttner | | H02K 17/165 |
| 2019/0020232 A1 * | 1/2019 | Buttner | | H02K 15/022 |

FOREIGN PATENT DOCUMENTS

| | | |
|---|---|---|
| JP | 9-93885 A | 4/1997 |
| JP | 9-201022 A | 7/1997 |
| JP | 2000-287419 A | 10/2000 |
| JP | 2001-186735 A | 7/2001 |
| JP | 2011-109774 A | 6/2011 |
| JP | 2014-90646 A | 5/2014 |
| JP | 5836253 B2 | 12/2015 |

* cited by examiner

SALIENT POLE ROTOR WITH MAGNETIC POLE PORTIONS, CONCAVE PORTIONS AND CYLINDRICAL COVER PORTION WITH FIBER FILAMENT

FIELD OF THE INVENTION

The present invention relates to a salient-pole rotor and a rotor manufacturing method.

BACKGROUND ART

In a supercharger such as a turbocharger, a multistage supercharging system in which a plurality of compressors, turbines, or the like are connected in series and form a multistage constitution to improve response and the like is known.

Further, as such a multistage supercharging system, there is a system in which some of a plurality of superchargers, for example, a supercharger on the low pressure side is driven by an electric motor. In addition, a multistage supercharging system using an electric compressor and a turbine generator has also been proposed.

Meanwhile, in electric motors or generators, making these magnetless has been promoted to reduce the influence of instability in the supply of rare earth elements and price fluctuations thereof. In such magnetless type electric motors or generators, a rotor is often of a salient-pole type. In such salient-pole rotor, tensile stress due to a centrifugal force or the like acts on a rotor side magnetic pole portion.

Patent Document 1 discloses a radial gap type switched reluctance motor in which a non-magnetic reinforcing portion formed of a non-magnetic material and formed in a cylindrical shape having a rotary shaft as a center axis by being coupled to a rotor side magnetic pole portion is provided to improve resistance to tensile stress of the rotor side magnetic pole portion formed by hardening soft magnetic powder.

CITATION LIST

Patent Documents

Patent Document 1
Japanese Unexamined Patent Application, First Publication No. 2014-90646

SUMMARY OF INVENTION

Technical Problem

In the electric motors or generators used in the above-described supercharger, especially for automobiles and the like, a rotation speed thereof is extremely high. Therefore, when a form of the rotor of the electric motor or the generator is a salient-pole type, centrifugal stress becomes too large. Accordingly, when a magnetic pole portion is formed by hardening a soft magnetic powder as in Patent Document 1 or when a slit for a magnetic flux barrier is disposed between magnetic pole portions adjacent in the circumferential direction, the resistance to tensile stress may be insufficient with only formation into a cylindrical shape with a non-magnetic resin or the like.

It is an object of the present invention to provide a salient-pole rotor capable of improving resistance to tensile stress even when a magnetic pole portion is formed by hardening soft magnetic powder or even when a slit for a magnetic flux barrier is disposed between magnetic pole portions adjacent in a circumferential direction, and a rotor manufacturing method therefor.

Solution to Problem

According to a first aspect of the present invention, a salient-pole rotor has a magnetic pole portion formed of a ferromagnetic material. The magnetic pole portion includes a base portion which extends in an axial direction of a rotary shaft and a plurality of protruding portions which protrude outward in a radial direction with respect to an axis from the base portion, is disposed to be spaced apart from each other at intervals in a circumferential direction of the rotary shaft and have outer circumferential surfaces along an imaginary cylindrical surface centered on the axis. The salient-pole rotor further includes a concave portion reinforcing portion which is provided in a concave portion between mutually adjacent protruding portions in the magnetic pole portion, formed of a non-magnetic material and has a shape in which an outer circumferential surface follows the imaginary cylindrical surface. The salient-pole rotor further includes a cylindrical reinforcing portion formed in a cylindrical shape which covers the magnetic pole portion along the imaginary cylindrical surface and the outer circumferential surface of the concave portion reinforcing portion and is formed of a non-magnetic material. The magnetic pole portion has a plurality of slits which extend in the circumferential direction at a radially inner portion of the concave portion in the base portion to be spaced apart from each other at intervals in the radial direction. The salient-pole rotor further includes a slit reinforcing portion which is provided inward from the slit and formed of a non-magnetic material.

Due to such a constitution, since the concave portion between adjacent protruding portions of the magnetic pole portion can be filled with the concave portion reinforcing portion, the outer circumferential surface of the rotor can be formed in a cylindrical shape along the imaginary cylindrical surface. Therefore, it is possible to reduce windage loss and to reduce an increase in temperature. Further, since the cylindrical reinforcing portion is provided, it is possible to minimize peeling of the concave portion reinforcing portion from the concave portion even when a centrifugal force is increased. Furthermore, the slit can be reinforced by the slit reinforcing portion while an effect of minimizing magnetic flux leakage due to the slit is maintained.

As a result, resistance to tensile stress can be improved even when a slit for a magnetic flux barrier is provided.

According to a second aspect of the present invention, in the salient-pole rotor, each of the plurality of slits according to first aspect may include a slit dividing portion which is formed to extend between adjacent magnetic pole portions in the circumferential direction and divides an inner space thereof in the circumferential direction of the rotary shaft.

Due to such a constitution, it is possible to minimize stress concentration due to the slit dividing portion and to improve strength while maintaining the magnetic flux barrier effect due to the slit.

According to a third aspect of the present invention, in the salient-pole rotor, the cylindrical reinforcing portion according to the first or second aspect may include a filament portion formed in an annular shape in which a direction of a fiber faces the circumferential direction of the rotary shaft and covers outer circumferential surfaces of the magnetic pole portion and the concave portion reinforcing portion, and a non-magnetic fixing portion which fixes the filament portion.

Due to such a constitution, while a weight increase due to the filament portion fixed by the nonmagnetic fixing portion is minimized, the strength can be improved as compared with a case in which the cylindrical reinforcing portion is formed without the filament portion.

According to a fourth aspect of the present invention, a salient-pole rotor has a magnetic pole portion formed of a plurality of ferromagnetic materials stacked in the axial direction. The magnetic pole portion includes a base portion which extends in an axial direction of a rotary shaft and a plurality of protruding portions which protrude outward in a radial direction of an axis from the base portion, is disposed to be spaced apart from each other at intervals in a circumferential direction of the rotary shaft and have outer circumferential surfaces along an imaginary cylindrical surface centered on the axis. The salient-pole rotor further includes a concave portion reinforcing portion which is provided in a concave portion between mutually adjacent protruding portions in the magnetic pole portion, formed of a non-magnetic material and has a shape in which an outer circumferential surface follows the imaginary cylindrical surface. The salient-pole rotor further includes a cylindrical reinforcing portion formed in a cylindrical shape which covers the magnetic pole portion along the imaginary cylindrical surface and the outer circumferential surface of the concave portion reinforcing portion and is formed of a non-magnetic material.

As described above, since the plurality of magnetic pole portions are stacked in the axial direction and the concave portion reinforcing portion and the cylindrical reinforcing portion are provided, sufficient resistance to tensile stress can be ensured as compared with, for example, a case in which the magnetic pole portion is formed by hardening soft magnetic powder.

According to a fifth aspect of the present invention, a method of manufacturing a rotor includes a magnetic pole forming step of forming a magnetic pole portion with a ferromagnetic material. The magnetic pole portion includes a base portion which extends in an axial direction of a rotary shaft, and a plurality of protruding portions which protrude outward in a radial direction of an axis from the base portion, is disposed to be spaced apart from each other at intervals in a circumferential direction of the rotary shaft and have outer circumferential surfaces along an imaginary cylindrical surface centered on the axis. The magnetic pole portion includes a plurality of slits which extend in the circumferential direction on a radial inner side of a concave portion between the protruding portions to be spaced apart from each other at intervals in the radial direction. The method of manufacturing a rotor further includes a filling step of filling the concave portion and the slit with a non-magnetic material. The method of manufacturing a rotor further includes a reinforcing step of reinforcing with a non-magnetic material to cover an outer circumferential surface of the magnetic pole portion along an imaginary cylindrical surface centered on the axis and an outer circumferential surface of the non-magnetic material in the concave portion.

Due to such a constitution, it is possible to simultaneously fill the slits and the concave portion with the non-magnetic material. Further, since the outer circumferential surface of the non-magnetic material in the concave portion is covered with the non-magnetic material by the reinforcing step, the non-magnetic material in the concave portion can be easily reinforced.

According to a sixth aspect of the present invention, in the method of manufacturing a rotor, the reinforcing step according to the fifth aspect may include a step of winding a filament around the outer circumferential surface of the magnetic pole portion along the imaginary cylindrical surface centered on the axis and the outer circumferential surface of the non-magnetic material in the concave portion and then impregnating the filament with a non-magnetic material.

Due to such a constitution, since sufficient strength in a centrifugal direction can be obtained by impregnating the filament with the non-magnetic material, the non-magnetic material in the concave portion can be easily and firmly reinforced.

Advantageous Effects of Invention

According to the salient-pole rotor, it is possible to improve resistance to tensile stress even when a magnetic pole portion is formed by hardening soft magnetic powder or even when a slit for a magnetic flux barrier is disposed between magnetic pole portions adjacent in a circumferential direction.

DESCRIPTION OF EMBODIMENTS

First Embodiment

Next, a salient-pole rotor and a rotor manufacturing method according to a first embodiment of the present invention will be described with reference to the drawings.

Figure 1:
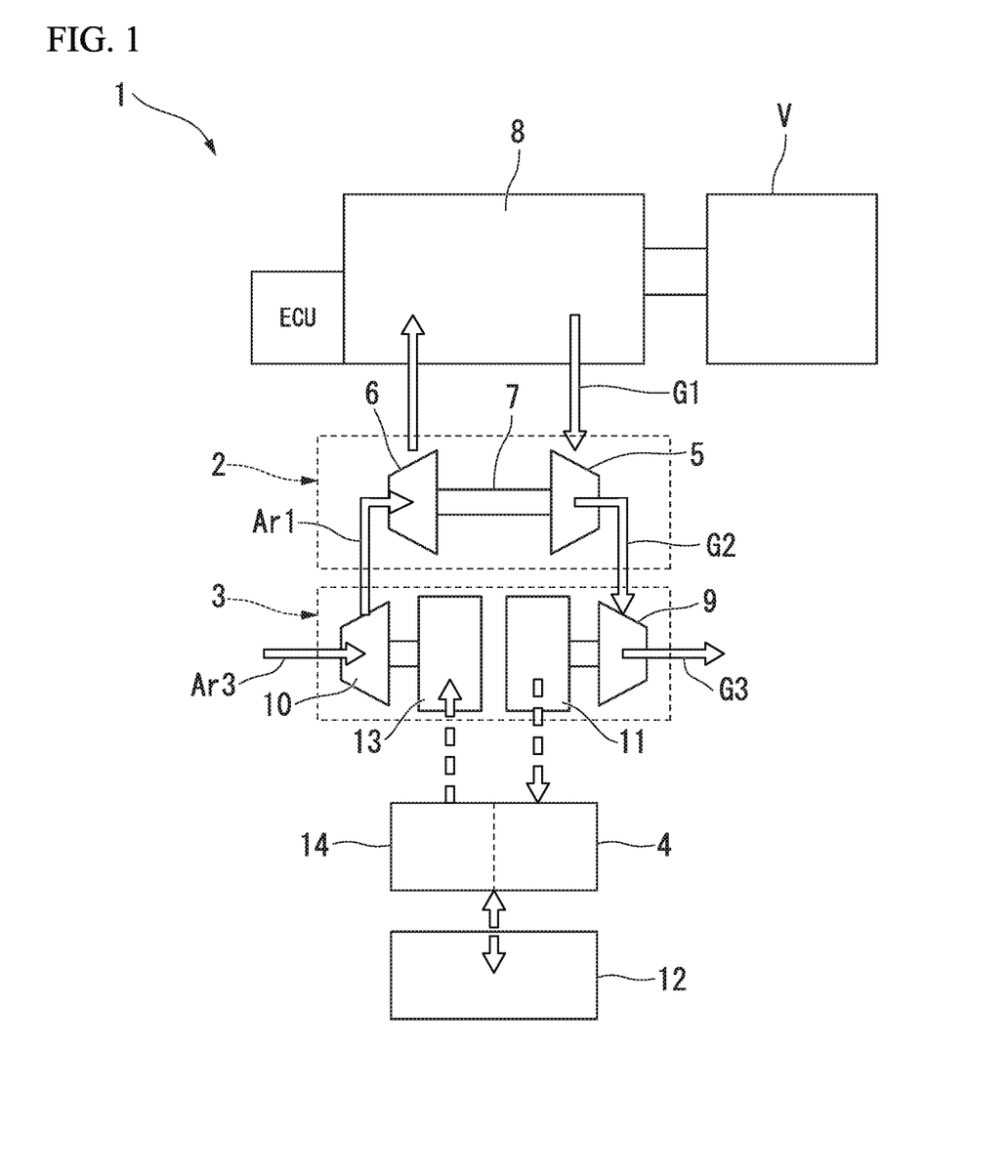
FIG. 1 is a diagram showing a schematic constitution of a multistage supercharging system according to a first embodiment of the present invention.
Figure 2:
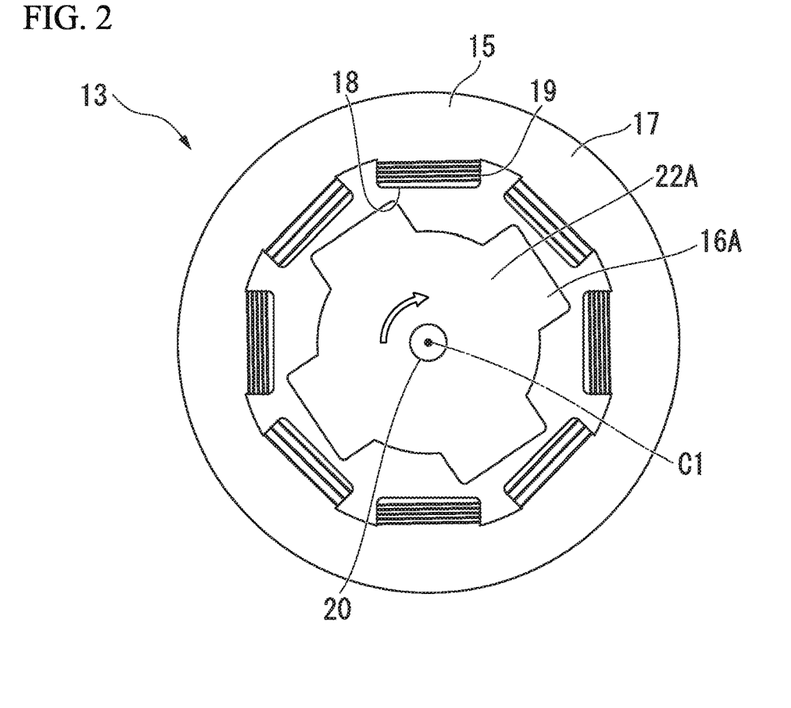
FIG. 2 is a cross-sectional view of a motor according to the first embodiment of the present invention.

FIG. 1 is a diagram showing a schematic constitution of a multistage supercharging system according to a first embodiment of the present invention. FIG. 2 is a sectional view of a motor according to the first embodiment of the present invention.

The multistage supercharging system in one example of the first embodiment is installed in a vehicle such as an automobile and is disposed in, for example, an engine compartment. Generally, a supercharger installed in a vehicle such as an automobile is designed assuming that it will exceed 200,000 rpm.

As shown in FIG. 1, the multistage supercharging system 1 in this embodiment includes a high-pressure side supercharger 2, a low-pressure side supercharger 3, and a converter 4.

The high-pressure side supercharger 2 includes a high-pressure side turbine 5, a high-pressure side compressor 6, and a rotary shaft 7.

The high-pressure side supercharger 2 is connected to an exhaust port (not shown) of an engine 8 via an exhaust pipe or the like and converts energy of exhaust gas G1 of the engine 8 into rotational energy. In addition, the high-pressure side supercharger 2 is connected to the high-pressure side compressor 6 via the rotary shaft 7. Exhaust gas G2 from which energy is recovered by the high-pressure side supercharger 2 is delivered to the low-pressure side supercharger 3.

The rotary shaft 7 is rotatably supported by, for example, a journal bearing (not shown) accommodated in a bearing housing (not shown) and a thrust bearing (not shown). The rotary shaft 7 transmits rotational energy of the high-pressure side supercharger 2 to the high-pressure side compressor 6.

The high-pressure side compressor 6 is connected to the low-pressure side supercharger 3 and further pressurizes air Ar1 pressurized by the low-pressure side supercharger 3 using the rotational energy transmitted from the high-pressure side supercharger 2 via the rotary shaft 7. Air Ar2 pressurized by the high-pressure side compressor 6 is delivered to an intake port (not shown) of the engine 8.

The low-pressure side supercharger 3 includes a low-pressure side turbine 9 and a low-pressure side compressor 10.

The low-pressure side turbine 9 is a so-called turbine generator including a generator 11. The low-pressure side turbine 9 recovers the energy of the exhaust gas G2 delivered from the high-pressure side turbine 5 and converts it into rotational energy, and converts the rotational energy into electrical energy with the generator 11. The exhaust gas G3 from which energy is recovered by the low-pressure side turbine 9 is discharged outside via an exhaust system (not shown) or the like which purifies the exhaust gas. The electrical energy generated by the generator 11 of the low-pressure side turbine 9 is charged into an energy storage 12 of the vehicle via the converter 4.

The low-pressure side compressor 10 is a so-called electric compressor equipped with an electric motor 13. The low-pressure side compressor 10 is driven by the electrical energy supplied from the energy storage 12 of the vehicle via the inverter 14. That is, a compressor wheel (not shown) of the low-pressure side compressor 10 is rotated by rotation of the electric motor 13. The low-pressure side compressor 10 pressurizes external air Ar3 introduced from an air cleaner box or the like and delivers the pressurized air to the high pressure side compressor 6. The low-pressure side compressor 10 has a compressor wheel which has a larger size than the high-pressure side compressor 6.

Here, the above-described converter 4 and the inverter 14 are controlled by an engine electronic control unit (ECU), and the driving of the electric motor 13 and the charging of the energy storage 12 are controlled by this control.

Next, the constitution of the electric motor 13 and a generator 11 will be described. Since the structures of the electric motor 13 and the generator 11 are basically the same, only the electric motor 13 will be described in the following description, and a detailed explanation of the generator 11 will be omitted.

FIG. 2 is a conceptual diagram of the electric motor according to the first embodiment of the present invention.

As shown in FIG. 2, the electric motor 13 includes a stator 15 and a rotor 16A. The stator 15 includes a yoke 17, teeth 18, and a winding 19. The electric motor 13 in this embodiment is, for example, a switched reluctance motor.

The yoke 17 is formed in a ring shape in which electromagnetic steel plates or the like are stacked in a direction in which a center axis C1 extends (hereinafter, referred to as an axial direction of the rotary shaft 20, or simply referred to as "axial direction"). The teeth 18 extend from the inner circumferential surface of the yoke 17 toward the center axis C1 thereof. A predetermined number of teeth 18 are formed at predetermined intervals in the circumferential direction centered on the center axis C1. The winding 19 is wound around a plurality of teeth 18 by concentrated winding or the like. Energization to the winding 19 is performed with the above-described inverter 14.

Figure 3:
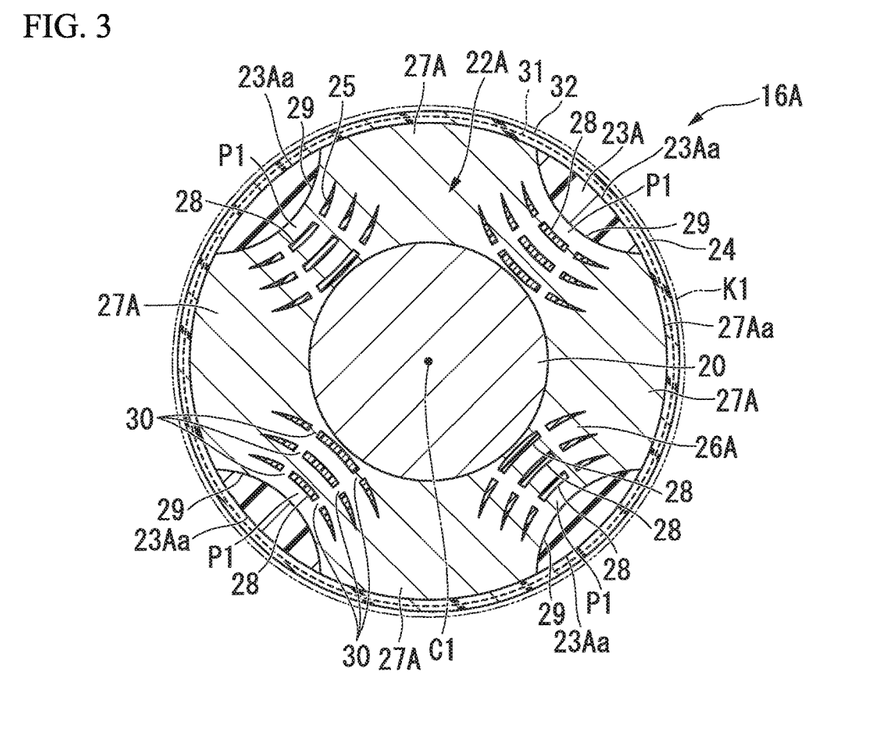
FIG. 3 is a cross-sectional view of a rotor according to the first embodiment of the present invention.

FIG. 3 is a cross-sectional view of the rotor in the first embodiment of the present invention.

As shown in FIG. 3, the rotor 16A includes a rotary shaft 20, a magnetic pole portion 22A, a concave portion reinforcing portion 23A, a cylindrical reinforcing portion 24, and a slit reinforcing portion 25.

The rotary shaft 20 is rotatably supported by at least two bearing portions of a motor case (not shown). The rotary shaft 20 is connected to a rotary shaft (not shown) of the low-pressure side compressor 10.

The magnetic pole portion 22A includes a base portion 26A and a protruding portion 27A. The magnetic pole portion 22A is formed of a plurality of ferromagnetic materials stacked in the axial direction of the rotary shaft 20, for example, a stacked steel plate or the like.

The base portion 26 is formed, for example, in a cylindrical shape which extends in the axial direction of the rotary shaft 20. The base portion 26 has the rotary shaft 20 passing therethrough so that a center thereof coincides with the center axis C1 of the rotary shaft 20.

The protruding portion 27A is formed to protrude outward from the base portion 26A in the radial direction centered on the center axis C1. A plurality of protruding portions 27A are provided at intervals in the circumferential direction centered on the center axis C1. In this embodiment, a case in which four protruding portions 27A are formed is shown. These protruding portions 27A are formed so that the respective outer circumferential surfaces thereof are along an imaginary cylindrical surface K1 centered on the center axis C1.

Here, a slit 28 is formed in the base portion 26A in this embodiment. The slit 28 is formed at a position P1 on a radial inner side of a concave portion 29 formed between adjacent protruding portions 27A in the circumferential direction. The concave portion 29 in this embodiment is formed in an arcuate concave curve which is concave toward the outside in the radial direction of the rotary shaft 20 in a cross section orthogonal to the rotary shaft 20.

Furthermore, a plurality of slits 28 are formed at the position P1 inward from each concave portion 29 in the radial direction centered on the center axis C1 to be spaced apart from each other at intervals in the radial direction centered on the center axis C1. In this embodiment, three slits 28 are provided at intervals in the radial direction of the rotary shaft 20. Each of the slits 28 is formed to extend in the circumferential direction and has the same length as the concave portion 29. In the length in the circumferential direction of the rotary shaft 20 in the slits 28 adjacent in the radial direction of the rotary shaft 20, the length formed on the radial inner side in the rotary shaft 20 is slightly longer than the one formed on the radial outer side in the rotary shaft 20.

The slit 28 in this embodiment is formed in a concave curved shape toward the radial outer side of the rotary shaft 20, and both ends thereof in the circumferential direction of the rotary shaft 20 are formed in a tapered shape. Furthermore, the slit 28 in this embodiment has a plurality of slit dividing portions 30. The slit dividing portion divides an inner space of the slit 28 in the circumferential direction of the rotary shaft 20. In this embodiment, two slit dividing portions 30 are formed for one slit 28, and the inner space of the slit 28 is divided into three spaces at equal intervals in the circumferential direction of the rotary shaft 20.

The concave portion reinforcing portion 23A is provided in a concave portion 29A of the magnetic pole portion 22A. The concave portion reinforcing portion 23A is formed of a non-magnetic material, and an outer circumferential surface 23Aa thereof is formed along the imaginary cylindrical surface K1. That is, an outer circumferential surface 27Aa of the protruding portion 27A of the magnetic pole portion 22A and an outer circumferential surface 23Aa of the concave portion reinforcing portion 23A form one circle centered on the rotary shaft 20 along the imaginary cylindrical surface K1 in a cross section orthogonal to the rotary shaft 20 by filling the concave portion 29A with the concave portion reinforcing portion 23A.

Here, examples of the non-magnetic material forming the concave portion reinforcing portion 23A include nylon, polytetrafluoroethylene, epoxy, a ceramic, a resin with added filler, a fiber reinforced plastic (FRP) plastic resin, and so on.

The cylindrical reinforcing portion 24 is formed in a cylindrical shape which covers the outer circumferential surface 27Aa of the protruding portion 27A and the outer circumferential surface 23Aa of the concave portion reinforcing portion 23A along the imaginary cylindrical surface K1. The cylindrical reinforcing portion 24 is formed of a non-magnetic material. The cylindrical reinforcing portion 24 in this embodiment is a so-called fiber reinforced plastic and includes a filament portion 31 and a fixing portion 32.

The filament portion 31 is formed of a string, band, sheet or the like of fibers. The filament portion 31 is formed in an annular shape in which at least a part of a direction of the fiber continuously covers the outer circumferential surface of the magnetic pole portion 22A and the outer circumferential surface of the concave portion reinforcing portion 23A in the circumferential direction of the rotary shaft 20. For example, a glass fiber tape knitted from glass fibers in a mesh form or the like can be used as the filament portion 31. The fibers are not limited to glass fibers, and other fibers may be used.

The fixing portion 32 fixes the filament portion 31. The fixing portion 32 solidifies in a state of being immersed in the filament portion 31 and covers the periphery of the filament portion 31. For the fixing portion 32, the same materials as for the concave portion reinforcing portion 23A described above are exemplary examples.

The rotor 16A in this embodiment has the above-described constitution. Next, a method of manufacturing the rotor 16A will be described with reference to the drawings.

Figure 4:
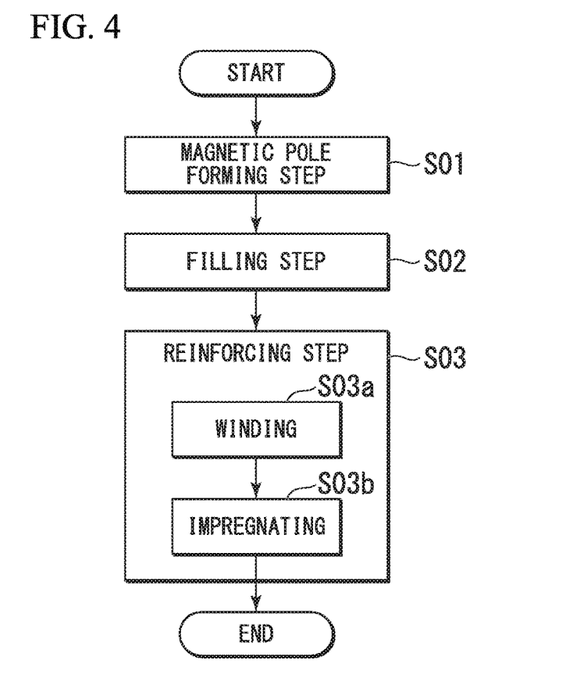
FIG. 4 is a flowchart showing a rotor manufacturing method according to the first embodiment of the present invention.
Figure 5:
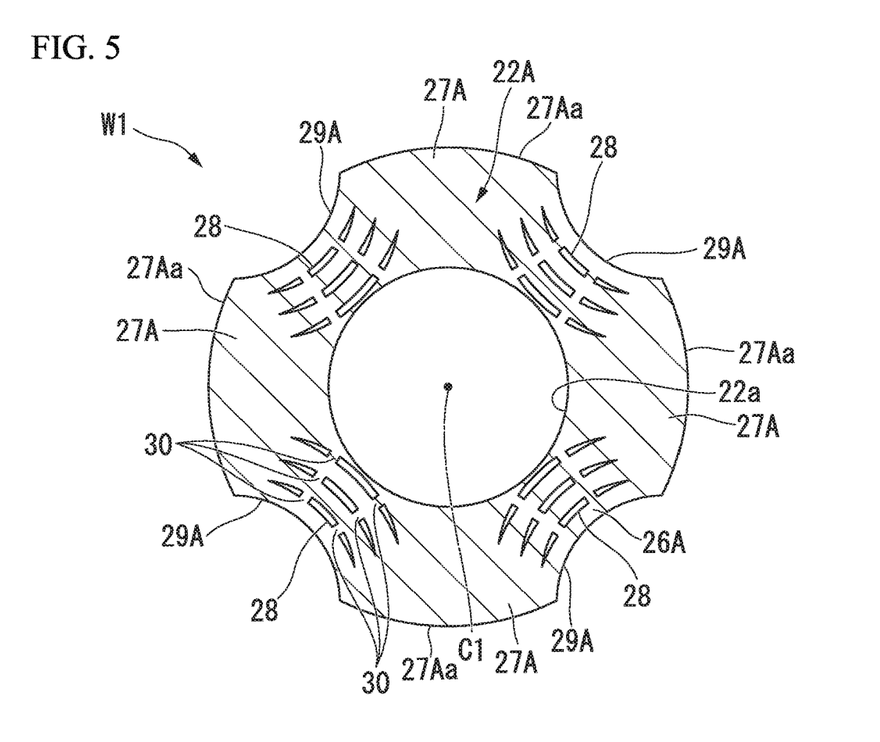
FIG. 5 is a view corresponding to FIG. 3 showing a workpiece W1 according to the first embodiment of the present invention.
Figure 6:
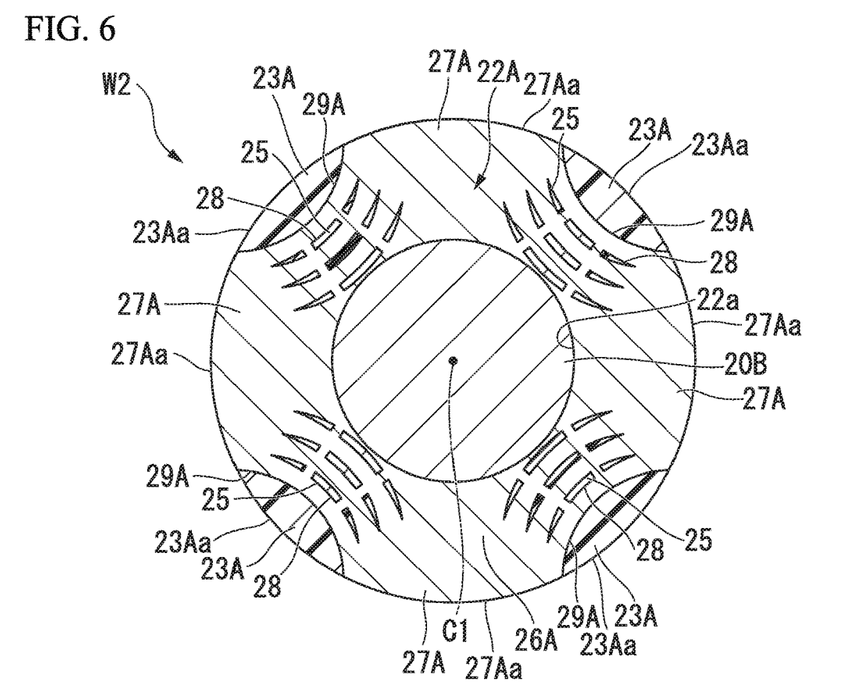
FIG. 6 is a view corresponding to FIG. 3 showing a workpiece W2 according to the first embodiment of the present invention.
Figure 7:
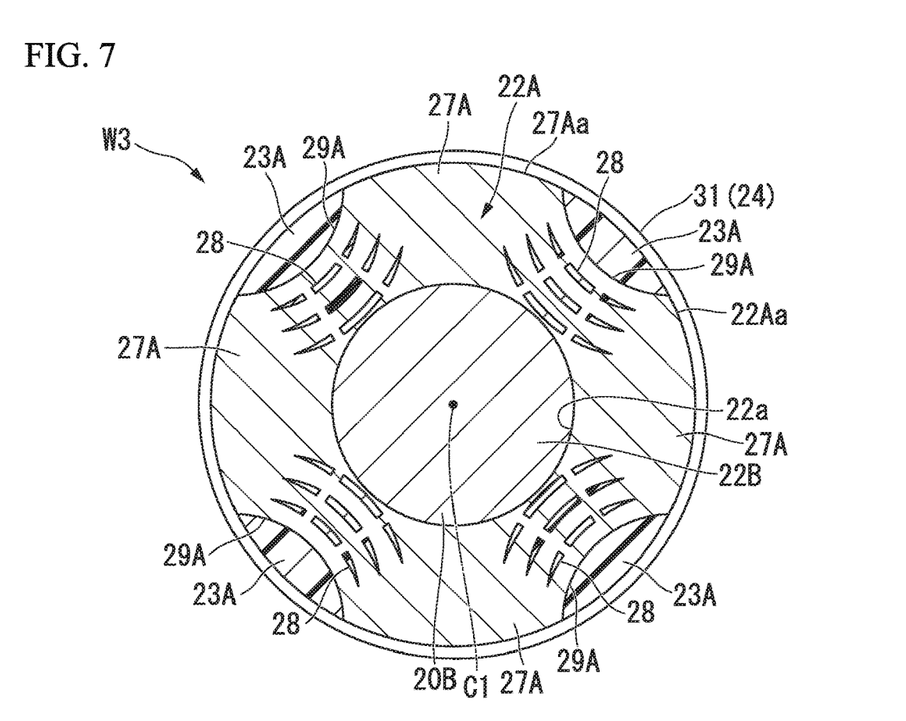
FIG. 7 is a view corresponding to FIG. 3 showing a workpiece W3 according to the first embodiment of the present invention.

FIG. 4 is a flowchart showing a rotor manufacturing method according to the first embodiment of the present invention. FIG. 5 is a view corresponding to FIG. 3 showing a workpiece W1 according to the first embodiment of the present invention. FIG. 6 is a view corresponding to FIG. 3 showing a workpiece W2 according to the first embodiment of the present invention. FIG. 7 is a view corresponding to FIG. 3 showing a workpiece W3 according to the first embodiment of the present invention.

As shown in FIG. 4, first, a magnetic pole forming step of forming the magnetic pole portion 22A is performed (Step S01). In this magnetic pole forming step, a plurality of flat plates of the same shape formed of a ferromagnetic material and having the base portion 26A, the protruding portion 27A, the slit 28, and the concave portion 29A described above are formed. Thereafter, the flat plates are stacked and then fixed by an adhesive or the like which is a non-magnetic material to integrate them. A workpiece W1 shown in FIG. 5 is completed by this magnetic pole forming step.

Next, a filling step of filling the inside of the concave portion 29A and the inside of the slit 28 with a non-magnetic material is performed. In this filling step, first, the workpiece W1 formed by the magnetic pole forming step is placed inside a mold (not shown) such as a cylindrical die or the like. An inner circumferential surface of this mold has an inner diameter slightly larger than an outer circumferential surface of the protruding portion 27A to be in contact with the outer circumferential surface of the protruding portion 27A. Thereafter, the non-magnetic material fills into the mold in a state of flowing. At this time, the non-magnetic material is charged while applying a predetermined pressure or evacuating air.

In this filling step, a provisional shaft body 20B is inserted through a center hole of the magnetic pole portion 22A. A through-hole 22a for installing the rotary shaft 20 is prevented from being filled with the non-magnetic material by inserting the provisional shaft body 20B. In addition, since the outer circumferential surface 27Aa of the protruding portion 27A is in contact with the inner circumferential surface of the mold, the non-magnetic material does not move to outside the outer circumferential surface of the protruding portion 27A.

Thereafter, the filled non-magnetic material is solidified, for example, by waiting for a predetermined time. Here, a method of solidifying the non-magnetic material varies depending on the type of the non-magnetic material. As the non-magnetic material is solidified, the concave portion reinforcing portion 23A and the slit reinforcing portion 25 are completed. Then, a workpiece W2 filled with the non-magnetic material shown in FIG. 6 is taken out from the mold.

Next, a reinforcing step of reinforcing with a non-magnetic material to cover the outer circumferential surface of the magnetic pole portion 22A along the imaginary cylindrical surface K1 and the outer circumferential surface of the non-magnetic material in the concave portion 29A is performed. In this reinforcing step, first, a filament is wound around an outer circumferential surface of the workpiece W2 (Step S03a). Accordingly, a workpiece W3 on which the filament portion 31 shown in FIG. 6 is formed is completed.

Thereafter, the workpiece W3 including the filament portion 31 is accommodated in a mold (not shown) for the reinforcing step. An inner circumferential surface (not shown) of the mold for this reinforcing step is disposed to be spaced apart from the outer circumferential surface 22Aa of the magnetic pole portion 22A and the outer circumferential surface of the non-magnetic material in the concave portion 29A over the entire circumference by a predetermined distance. The non-magnetic material in a fluid state is filled in gaps between the outer circumferential surface 22Aa of the magnetic pole portion 22A and the inner circumferential surface of the mold and between the outer circumferential surface 23Aa of the concave portion reinforcing portion 23A in the concave portion 29A and the inner circumferential surface of the mold, and the filament portion 31 is impregnated with the non-magnetic material (Step S03b). At this time, if necessary, the non-magnetic material is charged while applying a predetermined pressure or evacuating. Then, the non-magnetic material is solidified in the same manner as the above-described filling step and taken out from the mold for the reinforcing step. Further, the provisional shaft body 20B is pulled out from the through-hole 22a and removed. Then, the rotary shaft 20 is inserted and fixed into the through-hole 22a. Therefore, the rotor 16A shown in FIG. 3 is completed.

Therefore, according to the above-described first embodiment, since the concave portion reinforcing portion 23A can fill the concave portion 29A between adjacent protruding portions of the magnetic pole portion, the outer circumferential surface of the rotor 16A can be formed in a cylindrical shape along the imaginary cylindrical surface K1. Therefore, it is possible to reduce windage loss and to reduce temperature rise. Further, even when a centrifugal force is increased, it is possible to minimize peeling of the concave portion reinforcing portion 23A from the concave portion 29A by providing the cylindrical reinforcing portion 24. Furthermore, the slit 28 can be reinforced by the slit reinforcing portion 25 while maintaining an effect of minimizing the magnetic flux leakage by the slit 28. As a result, even when the slit 28 for a magnetic flux barrier is provided, the resistance to the tensile stress can be improved.

Furthermore, since the slit dividing portion 30 is provided, strength can be improved by minimizing stress concentration while the magnetic flux barrier effect due to the slit 28 is maintained.

Further, it is possible to ensure sufficient strength while minimizing a weight increase due to the filament portion 31 fixed by the fixing portion 32.

Further, according to the above-described manufacturing method of the rotor 16A, it is possible to simultaneously fill both of the slit 28 and the concave portion 29A with the non-magnetic material. Therefore, it is possible to easily reinforce the slit 28 and the concave portion 29A. Further, since the outer circumferential surface 23Aa of the concave portion reinforcing portion 23A can be covered with the non-magnetic material, the concave portion reinforcing portion 23A can be easily reinforced.

Further, sufficient strength in the centrifugal direction can be obtained by impregnating the filament portion 31 with a non-magnetic material. Therefore, it is possible to easily and strongly reinforce the non-magnetic material in the concave portion 29A.

Modified Example of the First Embodiment

The slit 28 is not limited to the shape shown in the first embodiment. For example, the slit 28 may be formed as in first to third modified examples.

First Modified Example

Figure 8:
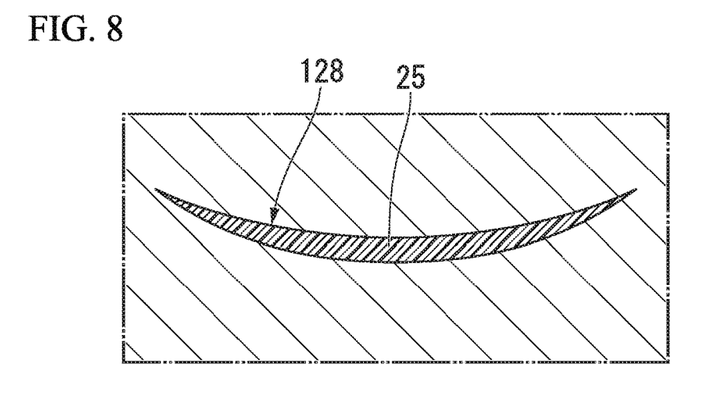
FIG. 8 is a cross-sectional view of a slit in a first modified example of the first embodiment of the present invention.

FIG. 8 is a cross-sectional view of a slit in a first modified example of the first embodiment of the present invention.

As shown in FIG. 8, a slit 128 in this first modified example is obtained by omitting the above-described slit dividing portion 30 (refer to FIG. 3). That is, an inner space of the slit 128 is formed in a concave shape which faces radially outward of the rotary shaft 20 and is gradually tapered toward both ends in the circumferential direction of the rotary shaft 20.

Second Modified Example

Figure 9:
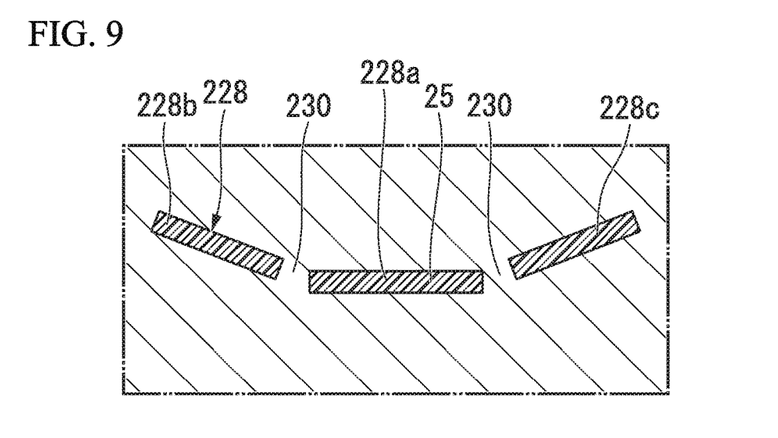
FIG. 9 is a cross-sectional view of a slit in a second modified example of the first embodiment of the present invention.

FIG. 9 is a cross-sectional view of a slit in a second modified example of the first embodiment of the present invention.

As shown in FIG. 9, a slit 228 in this second modified example is constituted by a combination of a plurality of holes having a rectangular cross section. In the slit 228, a center portion 228a in the circumferential direction of the rotary shaft 20 extends in a tangential direction of a circle which is concentric with the rotary shaft 20. Further, in the slit 228, a first end 228b and a second end 228c in the circumferential direction of the rotary shaft 20 are inclined to be disposed on the radial outer side of the rotary shaft 20 (disposed downward in FIG. 9) as they are away from the center portion 228a. It is possible to simplify a shape of the slit 228 by forming in this way while maintaining the magnetic flux barrier effect. Also, a slit dividing portion 230 which divides the slit 228 in the circumferential direction can be easily formed.

Third Modified Example

Figure 10:
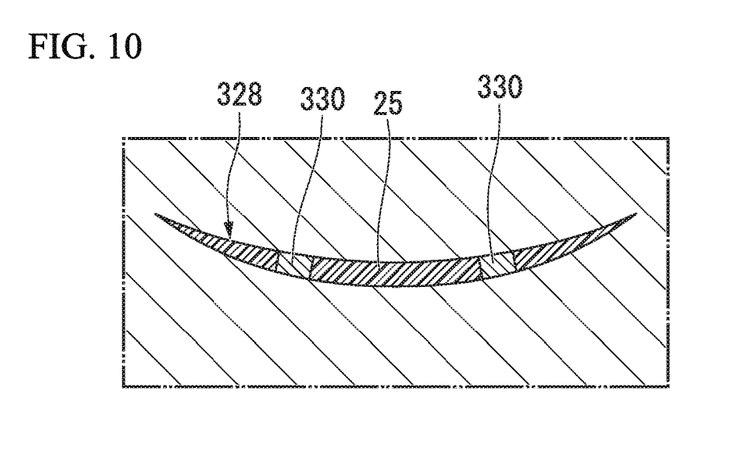
FIG. 10 is a cross-sectional view of a slit in a third modified example of the first embodiment of the present invention.

FIG. 10 is a cross-sectional view of a slit in a third modified example of the first embodiment of the present invention.

As shown in FIG. 10, a slit 328 in this third modified example has a slit dividing portion 330 which is a member separate from the base portion 26A. For example, the slit dividing portion 330 may be fixed to a plurality of positions in a length direction of the slit 128 of the above-described first modified example by fitting or the like. It is possible to easily reduce the stress concentration in the slit, for example, the slit 128 or the like not having the slit dividing portion 330 by forming the slit dividing portion 330 in this way.

Next, a second embodiment of the present invention will be described with reference to the drawings. The second embodiment is different from the above-described first embodiment only in the constitution of the base portion 26A. Therefore, the same parts as those of the first embodiment are designated by the same reference numerals, and a duplicate explanation will be omitted.

Figure 11:
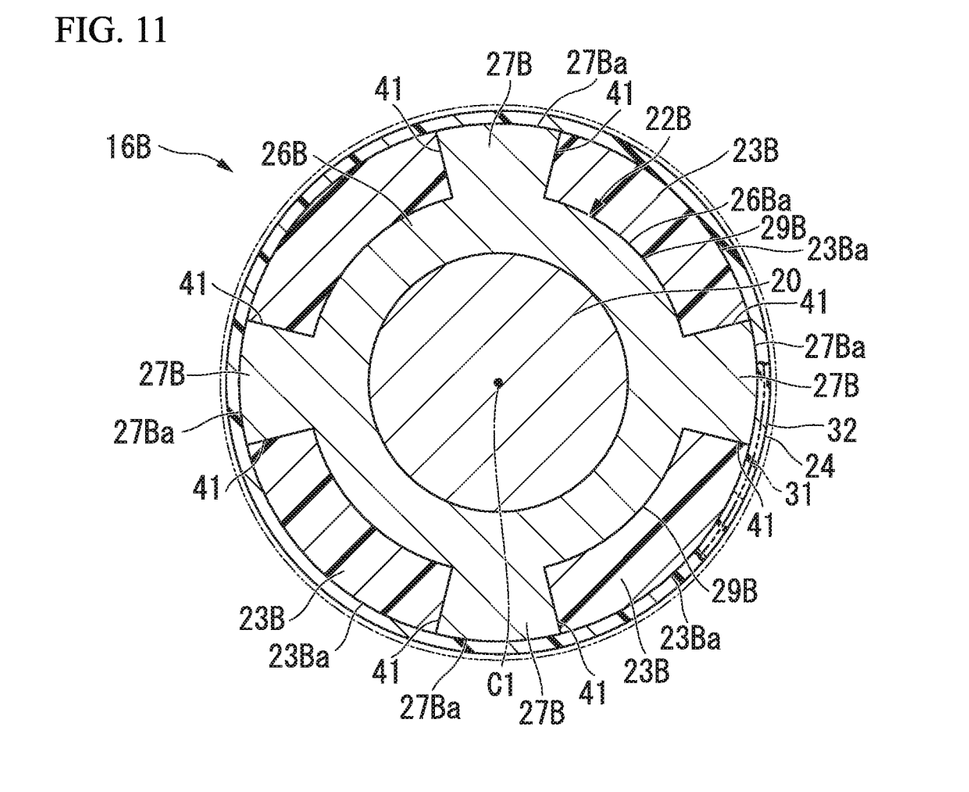
FIG. 11 is a cross-sectional view corresponding to FIG. 3 showing a rotor according to a second embodiment of the present invention.

FIG. 11 is a cross-sectional view corresponding to FIG. 3 showing a rotor according to a second embodiment of the present invention.

As shown in FIG. 11, a rotor 16B in this embodiment includes a rotary shaft 20, a magnetic pole portion 22B, a concave portion reinforcing portion 23B, and a cylindrical reinforcing portion 24.

The magnetic pole portion 22B includes a base portion 26B and a protruding portion 27B. The magnetic pole portion 22B is formed of a plurality of ferromagnetic materials stacked in the axial direction of the rotary shaft 20, for example, stacked steel plates or the like.

The base portion 26B is formed in, for example, a cylindrical shape extending in the axial direction of the rotary shaft 20. The rotary shaft 20 is integrated with the base portion 26 to pass through a center thereof. The base portion 26B is formed in a cylindrical shape having a constant width in the radial direction of the rotary shaft 20. The base portion 26B of this embodiment does not have the slit 28 as in the first embodiment.

The protruding portion 27B is formed to protrude outward from an outer circumferential surface 26Ba of the base portion 26B in the radial direction centered on the center axis C1. A plurality of protruding portion 27B are provided at intervals in the circumferential direction centered on the rotary shaft 20. In this embodiment, a case in which four protruding portions 27B are formed is shown. The protruding portions 27B are formed so that the respective outer circumferential surfaces 27Ba are along the imaginary cylindrical surface K1 centered on the center axis C1 (refer to FIG. 3). On the other hand, each of the protruding portions 27B is a flat surface in which a side surface 41 in the circumferential direction of the rotary shaft 20 expands in the radial direction or the axial direction of the rotary shaft 20.

A concave portion 29B is formed between the adjacent protruding portions 27B in the circumferential direction. The concave portion 29B in this embodiment is formed by the above-described side surface 41 and the outer circumferential surface 26Ba of the base portion 26B in a cross section orthogonal to the rotary shaft 20.

The concave portion reinforcing portion 23B is provided in a concave portion 29B of the magnetic pole portion 22B. The concave portion reinforcing portion 23B is formed of a non-magnetic material, and an outer circumferential surface 23Ba thereof is formed along the imaginary cylindrical surface K1. That is, an outer circumferential surface 27Ba of the protruding portion 27B of the magnetic pole portion 22B and an outer circumferential surface 23Ba of the concave portion reinforcing portion 23B form one circle centered on the rotary shaft 20 along the imaginary cylindrical surface K1 in a cross section orthogonal to the rotary shaft 20 by filling the concave portion 29B with the concave portion reinforcing portion 23B. Like the above-described concave portion reinforcing portion 23A, examples of the non-magnetic material forming the concave portion reinforcing portion 23B include nylon, polytetrafluoroethylene, epoxy, ceramic, a filler-mixed resin, a fiber reinforced plastic (FRP) plastic resin, and so on.

The cylindrical reinforcing portion 24 has the same constitution as the cylindrical reinforcing portion 24 of the first embodiment. The cylindrical reinforcing portion 24 is formed in a cylindrical shape which covers the outer circumferential surface 27Ba of the protruding portion 27B and the outer circumferential surface 23Ba of the concave portion reinforcing portion 23B along the imaginary cylindrical surface K1. The cylindrical reinforcing portion 24 is formed of a non-magnetic material. The cylindrical reinforcing portion 24 in this embodiment is formed of a so-called fiber reinforced plastic, like the first embodiment, and includes a filament portion 31 and a fixing portion 32.

Since the rotor 16B having the above-described constitution is different only in that it does not form the rotor 16A, the slit 28 and the slit reinforcing portion 25 of the first embodiment, it can be manufactured using the same manufacturing method. Therefore, a detailed description of a method of manufacturing the rotor 16B in the second embodiment will be omitted.

In the above-described second embodiment, a plurality of magnetic pole portions 22B are stacked in the axial direction of the rotary shaft 20, and the concave portion reinforcing portion 23B and the cylindrical reinforcing portion 24 are provided. Therefore, sufficient durability against the tensile stress due to an action of a centrifugal force can be ensured as compared with, for example, a case in which the magnetic pole portion is formed by hardening the soft magnetic powder and the concave portion reinforcing portion 23B and the cylindrical reinforcing portion 24 are provided.

The present invention is not limited to the above-described embodiments and includes various modifications to the above-described embodiments within the scope not deviating from the gist of the present invention. That is, the specific shapes and constitutions and so on described in the embodiments are merely examples and can be appropriately changed.

For example, in each of the above-described embodiments, for example, the length of the concave portion reinforcing portions 23A and 23B in the axial direction of the rotary shaft 20 may be formed to be longer than the magnetic pole portions 22A and 22B, and portions formed long may be cut to adjust the balance of the rotors 16A and 16B.

In the above-described first embodiment, the case in which the concave portion 29 is formed by an arcuate concave curve in the cross section in FIG. 3 has been described as exemplary example. However, the concave portion 29 is not limited to the shape shown in FIG. 3.

Further, in the first embodiment, the case in which the magnetic pole portion 22A is formed of the stacked steel plate has been described, but the magnetic pole portion 22A may be formed of, for example, soft magnetic material powder. Examples of the soft magnetic powders may include pure iron powder, iron-based alloy powder (Fe—Al alloy, Fe—Si alloy, sendust, permalloy, and so on) and amorphous powder.

Further, in each of the embodiments, the multistage supercharging system used for a vehicle such as an automobile has been described as an example, but the salient-pole rotor of the present invention is not limited to the one used for a vehicle. Furthermore, the present invention is not limited to one which performs multistage supercharging. Also, it is not limited to a salient-pole rotor for a supercharger of a reciprocating engine.

Also, it is not limited to the switched reluctance motor. For example, it can be applied to a synchronous reluctance motor or the like.

Further, in each of the above-described embodiments, the case of applying to the electric motor 13 has been described, but the same rotors 16A and 16B can be used in the electric generator 11.

INDUSTRIAL APPLICABILITY

The present invention can be applied to a salient-pole rotor. According to the present invention, the resistance to the tensile stress can be improved even when the magnetic pole portion is formed by hardening the magnetic powder or even when the slit for a magnetic flux barrier is formed between the adjacent magnetic pole portions in the circumferential direction.

REFERENCE SIGNS LIST

1 Multistage supercharging system
2 High-pressure side supercharger
3 Low-pressure side supercharger
4 Converter
5 High-pressure side turbine
6 High-pressure side compressor
7 Rotary shaft
8 Engine 9 Low-pressure side turbine
10 Low-pressure side compressor
11 Generator
12 Energy storage
13 Electric motor
14 Inverter
15 Stator
16A, 16B Rotor
17 Yoke
18 Teeth
19 Winding
20 Rotary shaft
22A, 22B Magnetic pole portion
22a Through-hole
23A, 23B Concave portion reinforcing portion
24 Cylindrical reinforcing portion
25 Slit reinforcing portion
26A, 26B Base portion
27A, 27B Protruding portion
28 Slit
29A, 29B Concave portion
30 Slit dividing portion
31 Filament portion
32 Fixing portion
41 Side surface
C1 Center axis

The invention claimed is:

1. A salient-pole rotor comprising: a magnetic pole portion formed of a plurality of ferromagnetic materials stacked in an axial direction and having a base portion which extends in an axial direction of a rotary shaft and a plurality of protruding portions which protrude outward in a radial direction of an axis from the base portion, is disposed to be spaced apart from each other at intervals in a circumferential direction of the rotary shalt and have outer circumferential surfaces along an imaginary cylindrical surface centered on the axis; a concave portion reinforcing portion which is provided in a concave portion between mutually adjacent protruding portions in the magnetic pole portion, formed of a non-magnetic material and has a shape in which an outer circumferential surface follows the imaginary cylindrical surface; and a cylindrical reinforcing portion formed in a cylindrical shape which covers the magnetic pole portion along the imaginary cylindrical surface and the outer circumferential surface of the concave portion reinforcing portion and is formed of a non-magnetic material, wherein the magnetic pole portion has a plurality of slits which extend in the circumferential direction at a radial inner portion of the concave portion in the base portion to be spaced apart from each other at intervals in the radial direction, and the magnetic pole portion further includes a slit reinforcing portion which is provided inward from the slit and formed of a non-magnetic material, and wherein each of the plurality of slits includes a slit dividing portion which is formed to extend between the adjacent protruding portions in the circumferential direction and divides an inner space thereof in the circumferential direction of the rotary shaft, wherein the cylindrical reinforcing portion includes a filament portion formed in an annular shape in which a direction of a fiber faces the circumferential direction of the rotary shaft and covers outer circumferential surfaces of the magnetic pole portion and the concave portion reinforcing portion, and a non-magnetic fixing portion which fixes the filament portion.

* * * * *